United States Patent
Marukawa et al.

(10) Patent No.: US 11,409,283 B2
(45) Date of Patent: Aug. 9, 2022

(54) VEHICLE STATE CONTROL APPARATUS, VEHICLE STATE CONTROL METHOD, AND VEHICLE

(71) Applicant: Sony Corporation, Tokyo (JP)

(72) Inventors: Kazuyuki Marukawa, Kanagawa (JP); Noriko Tanaka, Tokyo (JP); Itaru Shimizu, Tokyo (JP); Yasuhiro Yukawa, Kanagawa (JP); Shinnosuke Hayamizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 16/325,592

(22) PCT Filed: Aug. 10, 2017

(86) PCT No.: PCT/JP2017/029194
§ 371 (c)(1),
(2) Date: Feb. 14, 2019

(87) PCT Pub. No.: WO2018/037950
PCT Pub. Date: Mar. 1, 2018

(65) Prior Publication Data
US 2019/0179315 A1    Jun. 13, 2019

(30) Foreign Application Priority Data
Aug. 25, 2016 (JP) .............................. JP2016-164363

(51) Int. Cl.
*G05D 1/00* (2006.01)
*G06K 9/00* (2022.01)
(Continued)

(52) U.S. Cl.
CPC ........... *G05D 1/0088* (2013.01); *E05F 15/70* (2015.01); *G05D 1/0248* (2013.01);
(Continued)

(58) Field of Classification Search
CPC .. G05D 1/0088; G05D 1/0248; G05D 1/0257; G05D 2201/0213; E05F 15/70;
(Continued)

(56) References Cited

U.S. PATENT DOCUMENTS

| 9,381,916 B1 | 7/2016 | Zhu |
| 2002/0143452 A1* | 10/2002 | Losey .................... E05F 15/71 |
| | | 701/49 |

(Continued)

FOREIGN PATENT DOCUMENTS

| CN | 101510320 A | 8/2009 |
| CN | 103029702 A | 4/2013 |

(Continued)

OTHER PUBLICATIONS

Machine Translation of JP-2015060534-A (Year: 2015).*
(Continued)

*Primary Examiner* — Faris S Almatrahi
*Assistant Examiner* — Sahar Motazedi
(74) *Attorney, Agent, or Firm* — Wolf, Greenfield & Sacks, P.C.

(57) ABSTRACT

The present disclosure relates to a vehicle state control apparatus, a vehicle state control method, and a vehicle that make it possible to perform driving assistant in a drive-through area. In the drive-through area, a display unit, a window control unit, and the like in addition to a steering mechanism, a braking device, an engine, a driving motor, and a headlamp (not shown) are appropriately controlled on the basis of a result of image recognition output from an MCU to a bus, information supplied from another unit such as a radar and a lidar, and a sensing result from an in-vehicle sensor. That is, in the drive-through area, the state of the vehicle, which includes operations (such as presentation and opening/closing of the window) in addition to driving (trav- (Continued)

elling), is controlled. The present disclosure is applicable to, for example, a drive-through area drive control system.

14 Claims, 12 Drawing Sheets

(51) Int. Cl.
| | |
|---|---|
| *E05F 15/70* | (2015.01) |
| *G05D 1/02* | (2020.01) |
| *G08G 1/16* | (2006.01) |
| *G08G 1/09* | (2006.01) |
| *G06Q 30/06* | (2012.01) |
| *G06V 20/56* | (2022.01) |

(52) U.S. Cl.
CPC ........... *G05D 1/0257* (2013.01); *G06Q 30/06* (2013.01); *G06V 20/56* (2022.01); *G08G 1/09* (2013.01); *G08G 1/16* (2013.01); *E05Y 2900/55* (2013.01); *G05D 2201/0213* (2013.01)

(58) Field of Classification Search
CPC . E05F 2900/55; G06K 9/00791; G06Q 30/06; G08G 1/09; G08G 1/16
See application file for complete search history.

(56) References Cited

U.S. PATENT DOCUMENTS

| | | |
|---|---|---|
| 2009/0027188 A1 | 1/2009 | Saban |
| 2009/0055046 A1* | 2/2009 | Harumoto ............ B60H 1/00771 701/36 |
| 2014/0195283 A1 | 7/2014 | Stefik |
| 2015/0293534 A1* | 10/2015 | Takamatsu ............ B60W 50/08 701/28 |
| 2016/0159369 A1 | 6/2016 | Park |
| 2017/0001650 A1* | 1/2017 | Park ...................... B60W 30/06 |
| 2017/0153645 A1* | 6/2017 | Aoyagi ................ G05D 1/0225 |
| 2017/0329328 A1 | 11/2017 | Horita et al. |

FOREIGN PATENT DOCUMENTS

| | | | |
|---|---|---|---|
| CN | 103761864 A | | 4/2014 |
| CN | 104952276 A | | 9/2015 |
| CN | 104992562 A | | 10/2015 |
| CN | 205440122 U | | 8/2016 |
| DE | 10 2015 015 283 A1 | | 6/2016 |
| JP | 2004168415 A | | 6/2004 |
| JP | 2004280729 A | * | 10/2004 |
| JP | 2004-355145 A | | 12/2004 |
| JP | 2007-183824 A | | 7/2007 |
| JP | 2007237857 A | | 9/2007 |
| JP | 2009-113685 A | | 5/2009 |
| JP | 2015060534 A | * | 3/2015 |
| JP | 2016-130971 A | | 7/2016 |
| JP | 2017-097695 A | | 6/2017 |
| WO | WO 2015/057144 A1 | | 4/2015 |

OTHER PUBLICATIONS

Machine Translation of DE102015015283A1 (Year: 2015).*
Machine Translation of JP2004280729A (Year: 2004).*
International Search Report and English translation thereof dated Nov. 7, 2017 in connection with International Application No. PCT/JP2017/029194.
Written Opinion and English translation thereof dated Nov. 7, 2017 in connection with International Application No. PCT/JP2017/029194.
International Preliminary Report on Patentability and English translation thereof dated Mar. 7, 2019 in connection with International Application No. PCT/JP2017/029194.
Communication pursuant to Article 94(3) EPC dated Jun. 19, 2020 in connection with European Application No. 17843433.8.

* cited by examiner

VEHICLE STATE CONTROL APPARATUS, VEHICLE STATE CONTROL METHOD, AND VEHICLE

CROSS-REFERENCE TO RELATED APPLICATIONS

This application claims the benefit under 35 U.S.C. § 371 as a U.S. National Stage Entry of International Application No. PCT/JP2017/029194, filed in the Japanese Patent Office as a Receiving Office on Aug. 10, 2017, which claims priority to Japanese Patent Application Number JP2016-164363, filed in the Japanese Patent Office on Aug. 25, 2016, each of which is hereby incorporated by reference in its entirety.

TECHNICAL FIELD

The present disclosure relates to a vehicle state control apparatus, a vehicle state control method, and a vehicle, and particularly to a vehicle state control apparatus, a vehicle state control method, and a vehicle that make it possible to perform driving assistant in a drive-through area.

BACKGROUND ART

It has been proposed to perform, in a vehicle, an ADAS (Advanced Driving Assistant System) or automatic driving control as shown in Patent Literature 1.

CITATION LIST

Patent Literature

Patent Literature 1: Japanese Patent Application Laid-open No. 2007-183824

DISCLOSURE OF INVENTION

Technical Problem

Incidentally, a drive-through is ordinarily used as a function that provides products and services while the customer is in an automobile, and the facility therefor, and automatic driving and driving assistant are desired also in the drive-through area.

The present disclosure has been made in view of the above-mentioned circumstances to make it possible to perform driving assistant in a drive-through area.

Solution to Problem

A vehicle state control apparatus according to an aspect of the present technology includes: a vehicle entering/leaving detection unit that detects being in a drive-through area; and a control unit that controls a state of a vehicle in the drive-through area detected by the vehicle entering/leaving detection unit.

The control unit may control a travelling state of the vehicle as the state of the vehicle.

The vehicle state control apparatus may further include a riding state detection unit that detects a riding state of the vehicle, in which the control unit may control the state of the vehicle, corresponding to the riding state of the vehicle detected by the riding state detection unit.

The vehicle state control apparatus may further include a riding state detection unit that detects a riding state of the vehicle, in which the control unit may control the travelling state of the vehicle, corresponding to the riding state of the vehicle detected by the riding state detection unit.

The control unit may stop the vehicle at at least one of an order window, a pick-up window, or a payment window, as the travelling state of the vehicle.

The control unit may stop the vehicle at a position, corresponding to the riding state of the vehicle at the at least one window, as the travelling state of the vehicle.

The control unit may control, where a service at the at least one window is finished, travelling of the vehicle stopped as the travelling state of the vehicle.

The vehicle state control apparatus may further include a service completion detection unit that detects completion of a service, in which the control unit may control, in accordance with a detection result of the completion of the service by the service completion detection unit, the travelling of the vehicle stopped as the travelling state of the vehicle.

The control unit may cause, where the completion of the service is detected by the service completion detection unit, the vehicle stopped as the travelling state of the vehicle to start travelling.

The service may be a payment service.

The control unit may control, where being in the drive-through area is detected by the vehicle entering/leaving detection unit or the vehicle is stopped at the at least one window, opening/closing of a window of the vehicle as the state of the vehicle.

The control unit may control the opening/closing of the window of the vehicle, corresponding to weather.

The control unit may control the opening/closing of the window of the vehicle, corresponding to a security state.

The control unit may close the opened window of the vehicle on a condition that the service at the at least one window is finished or services at all the windows are finished.

The control unit may notify, where being in the drive-through area is detected by the vehicle entering/leaving detection unit, a user of presentation for selecting whether to set a mode of the vehicle to a drive-through area mode that is a driving assistant mode in the drive-through area.

The vehicle entering/leaving detection unit may detect, where the drive-through area mode is set, leaving the drive-through area, and the control unit may notify, where leaving the drive-through area is detected by the vehicle entering/leaving detection unit, the user of presentation regarding whether to release the drive-through area mode of the vehicle.

A vehicle state control method according to an aspect of the present technology includes: by a vehicle state control apparatus, detecting being in a drive-through area; and controlling a state of a vehicle in the detected drive-through area.

A vehicle according to an aspect of the present technology detects being in a drive-through area; and controls a state of the vehicle in the drive-through area detected by the vehicle entering/leaving detection unit.

In an aspect of the present technology, the state of the vehicle is controlled in the detected drive-through area.

Advantageous Effects of Invention

In accordance with the present technology, it is possible to perform driving assistance in a drive-through area.

It should be noted that the effect described herein is merely an example, the effect of the present technology is not limited to the effect described herein, and additional effects may be exerted.

MODE(S) FOR CARRYING OUT THE INVENTION

Hereinafter, embodiments for carrying out the present disclosure (hereinafter, referred to as embodiments) will be described.

Configuration Example of Vehicle

Figure 1:
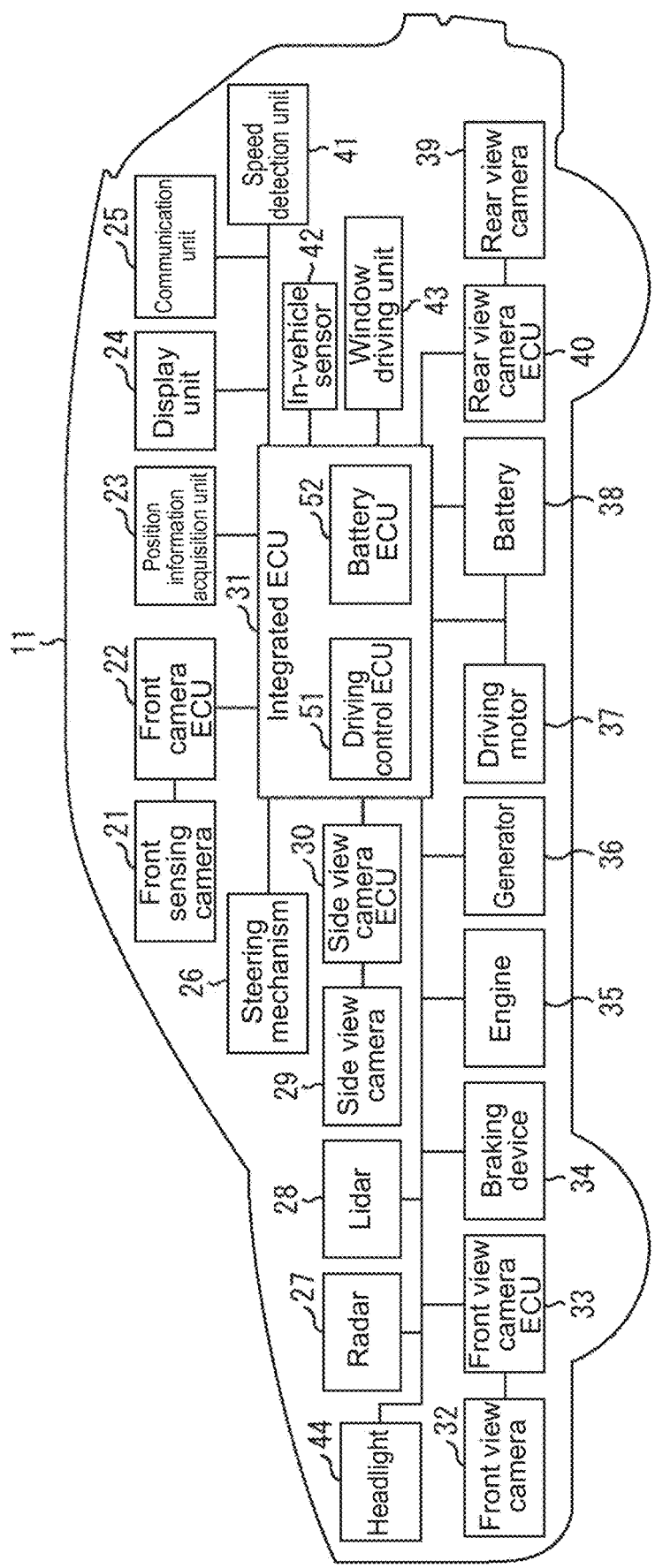
FIG. 1 is a block diagram showing a configuration example of an embodiment of a vehicle to which the present technology is applied.

FIG. 1 is a diagram showing a configuration example of an embodiment of a vehicle to which the present technology is applied.

A vehicle 11 shown in FIG. 1 includes a front sensing camera 21, a front camera ECU (Electronic Control Unit) 22, a position information acquisition unit 23, a display unit 24, a communication unit 25, a steering mechanism 26, a radar 27, a lidar (LIDAR) 28, a side view camera 29, a side view camera ECU 30, an integrated ECU 31, a front view camera 32, a front view camera ECU 33, a braking device 34, an engine 35, a generator 36, a driving motor 37, a battery 38, a rear view camera 39, a rear view camera ECU 40, and a speed detection unit 41. Further, the vehicle 11 includes also an in-vehicle sensor 42, a window control unit 43, and a headlight 44.

The units provided in the vehicle 11 are connected to each other by a bus for CAN (Controller Area Network) communication, another connection line, and the like. However, in order to make the figure easy to see, the bus, the connection line, and the like are drawn without particularly distinguishing them.

The front sensing camera 21 includes, for example, a camera dedicated to sensing disposed in the vicinity of a room mirror in the vehicle, images the front of the vehicle 11 as a subject, and outputs the resulting sensing image to the front camera ECU 22.

The front camera ECU 22 appropriately performs processing of improving the image quality or the like on the sensing image supplied from the front sensing camera 21, and then performs image recognition on the sensing image, thereby detecting an arbitrary object such as a white line and a pedestrian from the sensing image. The front camera ECU 22 outputs the result of image recognition to the bus for CAN communication.

The position information acquisition unit 23 includes, for example, a position information measuring system such as a GPS (Global Positioning System), detects the position of the vehicle 11, and outputs the position information indicating the detection result to the bus for CAN communication.

The display unit 24 includes, for example, a liquid crystal display panel, and is disposed at a predetermined position in the vehicle such as the center position of an instrument panel and the inside of a room mirror. Further, the display unit 24 may be a transmissive display superimposed and provided on a windshield part, or a display of a car navigation system. The display unit 24 displays various images under the control of the integrated ECU 31.

The communication unit 25 transmits/receives information to/from a peripheral vehicle, a portable terminal device possessed by a pedestrian, a roadside device, or an external server by various kinds of wireless communication such as inter-vehicle communication, vehicle-to-pedestrian communication, and road-to-vehicle communication. For example, the communication unit 25 performs inter-vehicle communication with a peripheral vehicle, receives, from the peripheral vehicle, peripheral vehicle information including information indicating the number of occupants and the travelling state, and supplies it to the integrated ECU 31.

The steering mechanism 26 performs control of the traveling direction of the vehicle 11, i.e., steering angle control, in accordance with the driver's steering wheel operation or the control signal supplied from the integrated ECU 31. The radar 27 is a distance measuring sensor that measures the distance to an object such as a vehicle and a pedestrian in each direction such as forward and backward by using electromagnetic waves such as millimeter waves, and outputs the result of measuring the distance to the object to the integrated ECU 31 or the like. The lidar 28 is a distance measuring sensor that measures the distance to an object such as a vehicle and a pedestrian in each direction such as forward and backward by using light waves, and outputs the result of measuring the distance to the object to the integrated ECU 31 or the like.

The side view camera 29 is, for example, a camera disposed in a casing of a side mirror or in the vicinity of the side mirror, captures an image of the side (hereinafter, referred to also as the side image) of the vehicle 11 including an area to be a blind spot of the driver, and supplies it to the side view camera ECU 30.

The side view camera ECU 30 performs image processing of improving the image quality such as white balance adjustment on the side image supplied from the side view camera 29, and supplies the obtained side image to the integrated ECU 31 via a cable different from the bus for CAN communication.

The integrated ECU 31 includes a plurality of ECUs such as a driving control ECU 51 and a battery ECU 52 arranged at the center of the vehicle 11, and controls the operation of the entire vehicle 11.

For example, the driving control ECU 51 is an ECU realizing an ADAS (Advanced Driving Assistant System) function or an automated driving (Self driving) function, and controls the driving (travelling) of the vehicle 11 on the basis of various kinds of information such as the image recognition result from the front camera ECU 22, the position information from the position information acquisition unit 23, the peripheral vehicle information supplied from the communication unit 25, the measurement results from the radar 27 and the lidar 28, the result of detecting the travelling speed from the speed detection unit 41, and the like. That is, the driving control ECU 51 controls the steering mechanism 26, the braking device 34, the engine 35, the driving motor 37, and the like to control the driving of the vehicle 11. Further, the driving control ECU 51 controls, on the basis of presence or absence of head light of the oncoming vehicle, or the like, which is supplied from the front camera ECU 22 as the image recognition result, the headlight 44 to control beam application by the headlight 44 such as switching between a high beam and a low beam.

Note that in the integrated ECU 31, a dedicated ECU may be provided for each of the functions including the ADAS function, the automated driving function, and the beam control.

Further, the driving control ECU 51 detects, on the basis of the image recognition result from the front camera ECU 22, the position information from the position information acquisition unit 23, various types of information such as the peripheral vehicle information supplied from the communication unit 25, the measurement results from the radar 27 and the lidar 28, the detection result of the travelling speed from the speed detection unit 41, the detection result from the in-vehicle sensor 42, and the like, being in a drive-through area, and controls, in the detected drive-through area, the state of the vehicle 11 including driving (travelling) and operations (such as presentation and opening/closing of the window) of the vehicle 11. That is, the driving control ECU 51 controls the display unit 24, the steering mechanism 26, the braking device 34, the engine 35, the driving motor 37, the window driving unit 43, and the like to control the state of the vehicle 11.

Further, the battery ECU 52 controls power supply or the like by the battery 38.

The front view camera 32 includes, for example, a camera disposed in the vicinity of a front grille, captures an image of the front (hereinafter, referred to also as the front image) of the vehicle 11 including an area to be a blind spot of the driver, and supplies it to the front view camera ECU 33.

The front view camera ECU 33 performs image processing of improving the image quality such as white balance adjustment on the front image supplied from the front view camera 32, and supplies the obtained front image to the integrated ECU 31 via a cable different from the bus for CAN communication.

The braking device 34 operates in accordance with the driver's braking operation or the control signal supplied from the integrated ECU 31, and stops or decelerates the vehicle 11. The engine 35 is a power source of the vehicle 11, and is driven in accordance with the control signal supplied from the integrated ECU 31.

The generator 36 is controlled by the integrated ECU 31, and generates power in accordance with driving of the engine 35. The driving motor 37 is a power source of the vehicle 11, receives power supply from the generator 36 or the battery 38, and is driven in accordance with the control signal supplied from the integrated ECU 31. Note that whether to drive the engine 35 or the driving motor 37 during travelling of the vehicle 11 is appropriately switched by the integrated ECU 31.

The battery 38 includes, for example, a battery of 12 V or a battery of 200 V, and supplies power to the respective units of the vehicle 11 in accordance with the control of the battery ECU 52.

The rear view camera 39 includes, for example, a camera disposed in the vicinity of a license plate of a tailgate, captures an image of the rear side (hereinafter, referred to also as the rear image) of the vehicle 11 including an area to be a blind spot of the driver, and supplies it to the rear view camera ECU 40. For example, the rear view camera 39 is activated when a shift lever (not shown) is moved to the position of the reverse (R).

The rear view camera ECU 40 performs image processing of improving the image quality such as white balance adjustment on the rear image supplied from the rear view camera 39, and supplies the obtained rear image to the integrated ECU 31 via a cable different from the bus for CAN communication.

The speed detection unit 41 is a sensor that detects the travelling speed of the vehicle 11, and supplies the result of detecting the travelling speed to the integrated ECU 31. Note that in the speed detection unit 41, from the result of detecting the traveling speed, the acceleration, or the differential of the acceleration may be calculated. For example, the calculated acceleration is used for estimating the time until the collision of the vehicle 11 with an object.

The in-vehicle sensor 42 is a sensor that detects an adult and a child in the vehicle 11, and supplies the detection result of the inside of the vehicle 11 to the integrated ECU 31. For example, the in-vehicle sensor 42 detects information regarding which seat in the vehicle a person is sitting, whether he/she is an adult or a child, and the like. For example, in the case where a child seat is mounted, it may be detected that the riding person is a child. Note that instead of the in-vehicle sensor 42, an in-vehicle camera and an in-vehicle camera ECU may be provided. In this case, information regarding which seat in the vehicle a person is sitting, whether he/she is an adult or a child, and the like is detected by performing image recognition on the sensing image captured by the in-vehicle camera. Further, the in-vehicle sensor 42 may detect also a family member (specific person).

The window driving unit 43 operates in response to the control signal supplied from the integrated ECU 31, and open/closes the window of the vehicle 11.

The headlight 44 operates in accordance with the control signal supplied rom the integrated ECU 31, and illuminates the front of the vehicle 11 by outputting a beam.

Figure 2:
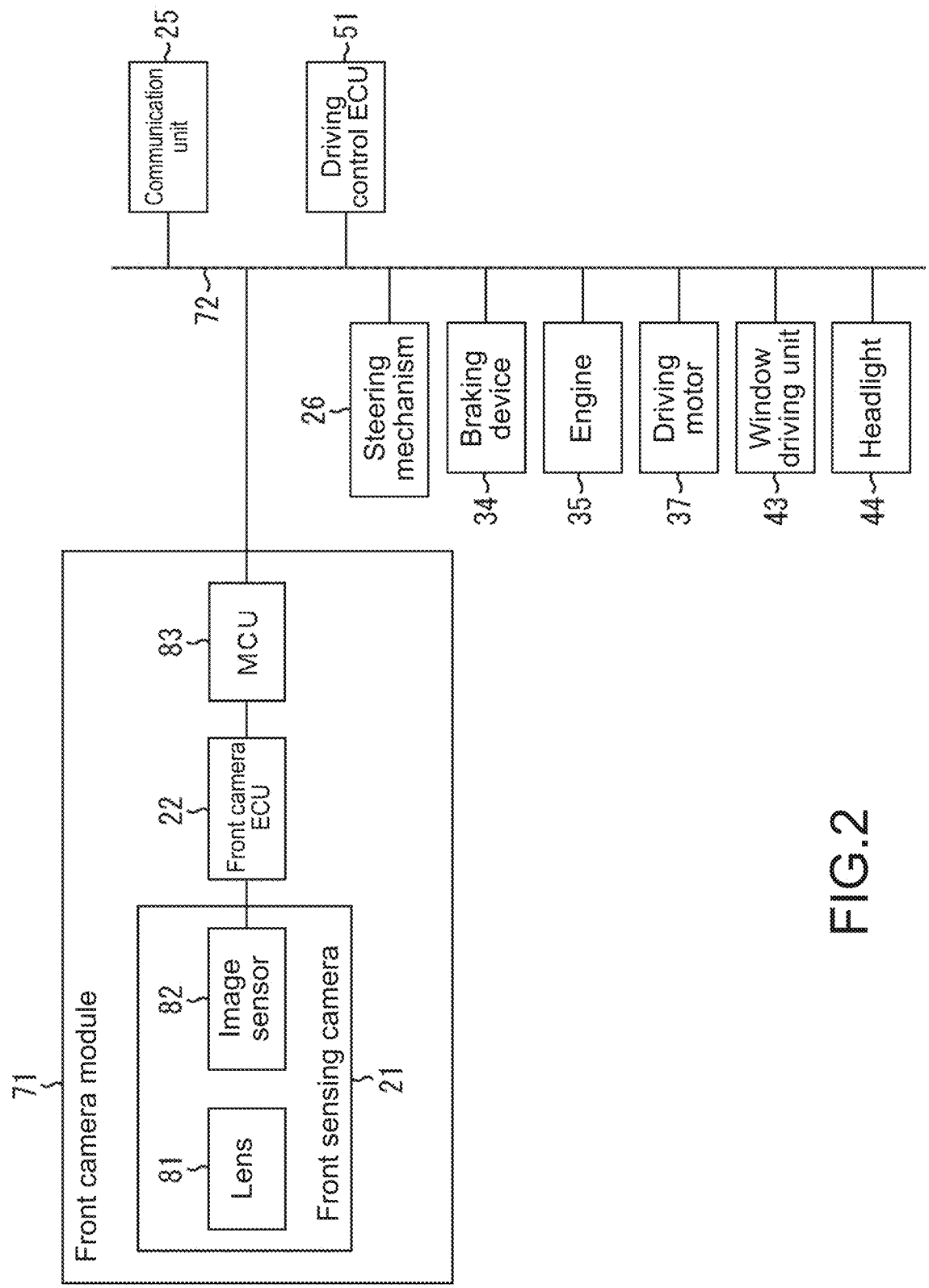
FIG. 2 is a diagram showing a connection example by a bus for CAN communication.

Further, in the vehicle 11, as shown in FIG. 2, a plurality of units including a front camera module 71, the communication unit 25, the driving control ECU 51, the steering mechanism 26, the braking device 34, the engine 35, the driving motor 37, the window driving unit 43, and the headlight 44 are connected to each other via a bus 72 for CAN communication. Note that the components corresponding to those in FIG. 1 are denoted by the same reference symbols in FIG. 2, and description thereof will be appropriately omitted.

In this example, the front camera module 71 includes a lens 81, an image sensor 82, the front camera ECU 22, and an MCU (Module Control Unit) 83.

Further, the lens 81 and the image sensor 82 constitute the front sensing camera 21, and the image sensor 82 includes, for example, a CMOS (Complementary Metal Oxide Semiconductor) image sensor.

In the front camera module 71, light from a subject is collected on the imaging surface of the image sensor 82 by the lens 81. The image sensor 82 captures a sensing image by photoelectrically converting light that has entered from the lens 81, and supplies it to the front camera ECU 22.

The front camera ECU 22 performs, for example, gain adjustment, white balance adjustment, HDR (High Dynamic Range) processing, and the like on the sensing image supplied from the image sensor 82, and then performs image recognition on the sensing image.

In the image recognition, for example, a white line, a curb stone, a pedestrian, a vehicle, a headlight, a brake light, a road sign, a time until a collision with the forward vehicle, and the like are recognized (detected). The recognition results of the image recognition are converted into signals in a format for CAN communication by the MCU 83, and output to the bus 72.

Further, information supplied from the bus 72 is converted into a signal in a format defined for the front camera module 71 by the MCU 83, and supplied to the front camera ECU 22.

The driving control ECU 51 appropriately controls the steering mechanism 26, the braking device 34, the engine 35, the driving motor 37, the headlight 44, and the like on the basis of the result of image recognition output from the MCU 83 to the bus 72 and information supplied from other units such as the radar 27 and the lidar 28. Accordingly, driving control such as a change in the travelling direction, braking, acceleration, and starting, warning notification control, headlight switching control, and the like are realized. Note that as the switching control of the headlight 44, for example, control of prohibiting high beam, turning off manual/automatic switching control for high beam at the time of drive through, or automatically switching at the time of high beam is performed. Accordingly, driving control such as change of the travelling direction, braking, acceleration, and starting, warning notification control, beam switching control, and the like are realized.

Further, in the case where the driving control ECU 51 realizes the automated driving function or the like, for example, the locus of the position of the target object may be further recognized by the driving control ECU 51 from the image recognition result at each time obtained by the front camera ECU 22, and such a recognition result may be transmitted to an external server via the communication unit 25. In such a case, for example, in the server, learning such as a deep neural network is performed, and a necessary dictionary or the like is generated and transmitted to the vehicle 11. In the vehicle 11, the dictionary or the like obtained in this way is received by the communication unit 25, and the received dictionary or the like is used for various predictions and the like in the driving control ECU 51.

Further, in the drive-through area, the display unit 24, the window control unit 43, and the like in addition to the steering mechanism 26, the braking device 34, the engine 35, the driving motor 37, and the headlamp (not shown) are appropriately controlled on the basis of the result of image recognition output from the MCU 83 to the bus 72, information supplied from other units such as the radar 27 and the lidar 28, and the sensing result from the in-vehicle sensor 42. That is, in the drive-through area, the state of the vehicle 11, which includes operations (such as presentation and opening/closing of the window) in addition to the above-mentioned driving (travelling), is controlled.

Note that of the controls performed by the driving control ECU 51, control that can be realized from only the result of image recognition on the sensing image may be performed not by the driving control ECU 51 but by the front camera ECU 22.

Specifically, for example, the front camera ECU 22 may control the headlight 44 on the basis of the presence or absence of headlight of the oncoming vehicle, which is obtained by the image recognition on the sensing image. In this case, for example, the front camera ECU 22 generates a control signal that instructs switching between a low beam and a high beam, or the like, and supplies the control signal to the headlight 44 via the MCU 83 and the bus 72, thereby controlling the beam switching by the headlight 44.

Alternatively, for example, the front camera ECU 22 may generate a warning notice of a collision against an object and a warning notice of departure from the travelling lane (lane) on the basis of the result of recognizing a white line, a curb stone, a pedestrian, and the like, which is obtained by the image recognition on the sensing image, and output it to the bus 72 via the MCU 83, thereby controlling the warning notice. In this case, the warning notice output from the front camera ECU 22 is supplied to, for example, the display unit 24 or a speaker (not shown). Accordingly, it is possible to display a warning on the display unit 24 or output a warning message through the speaker.

Further, in the vehicle 11, by displaying a composite image on the display unit 24 at the time of parking, for example, the around view monitor function is realized.

Figure 3:
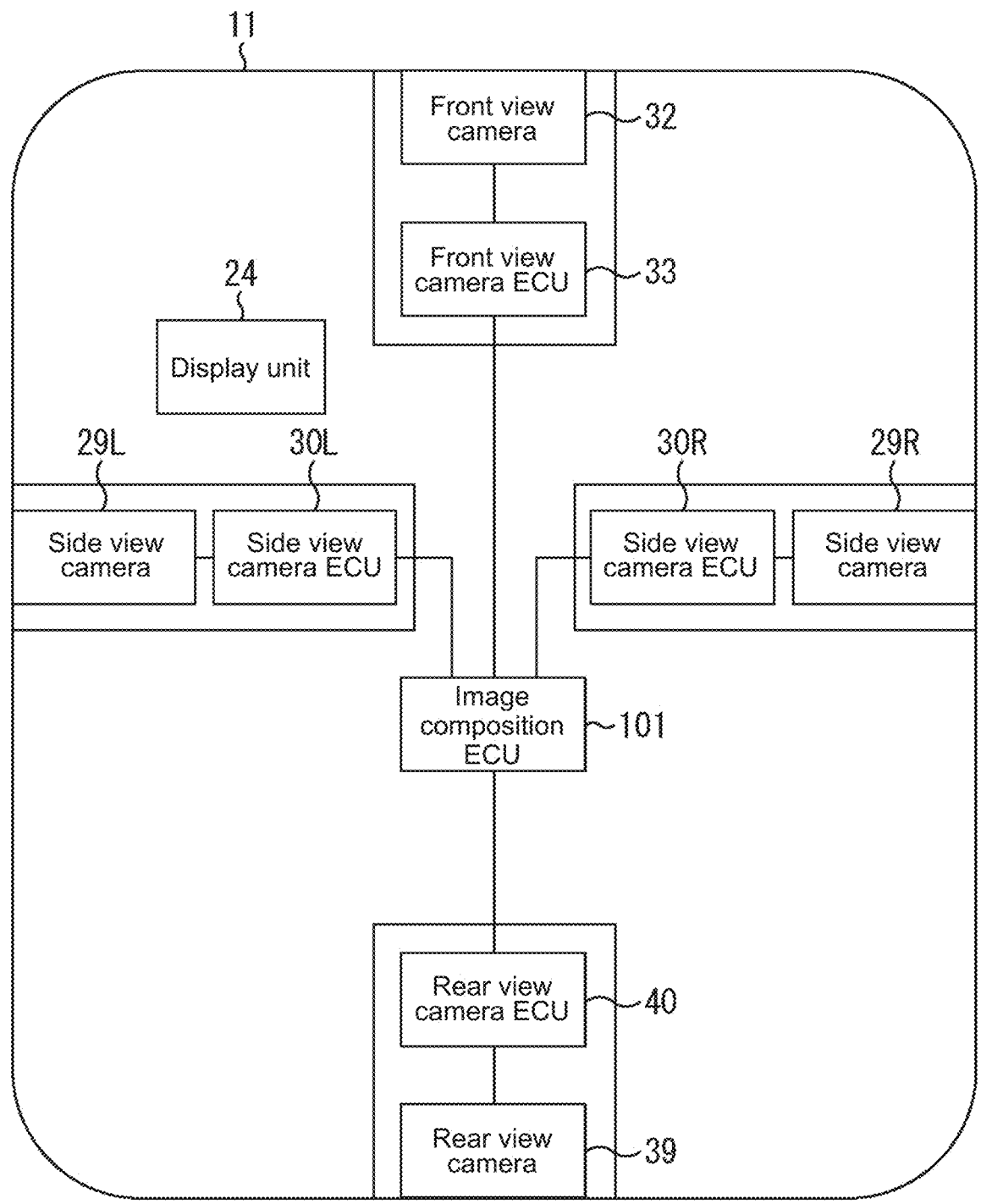
FIG. 3 is a diagram describing an around view monitor function.

That is, as shown in FIG. 3, the front image, the rear image, and the side image obtained by the respective units are supplied, via a cable different from the bus for CAN communication, to an image composition ECU 101 provided in the integrated ECU 31, and a composite image is generated from the images. Note that the components corresponding to those in FIG. 1 are denoted by the same reference symbols in FIG. 3, and description thereof will be appropriately omitted.

In FIG. 3, as the side view camera 29 shown in FIG. 1, a side view camera 29L disposed on the left side of the vehicle 11 and a side view camera 29R disposed on the right side of the vehicle 11 are provided. Further, as the side view camera ECU 30, a side view camera ECU 30L disposed on the left side of the vehicle 11 and a side view camera ECU 30R disposed on the right side of the vehicle 11 are provided.

To the image composition ECU 101, the front image obtained by the front view camera 32 is supplied from the front view camera ECU 33 and the rear image obtained by the rear view camera 39 is supplied from the rear view camera ECU 40. Further, to the image composition ECU 101, the side image obtained by the side view camera 29L (hereinafter, particularly referred to also as the left side image) is supplied from the side view camera ECU 30L and the side image obtained by the side view camera 29R (hereinafter, particularly referred to also as the right side image) is supplied from the side view camera ECU 30R.

The image composition ECU 101 generates, on the basis of the supplied images, a composite image in which the front image, the rear image, the left side image, and the right side image are arranged in corresponding areas, and supplies the obtained composite image to the display unit 24 for display. The driver is capable of safely and easily parking the vehicle 11 by driving the vehicle 11 while watching the composite image displayed in this way. Note that the integrated ECU 31 may control the driving of the vehicle 11 on the basis of the composite image, and park the vehicle 11.

Figure 4:
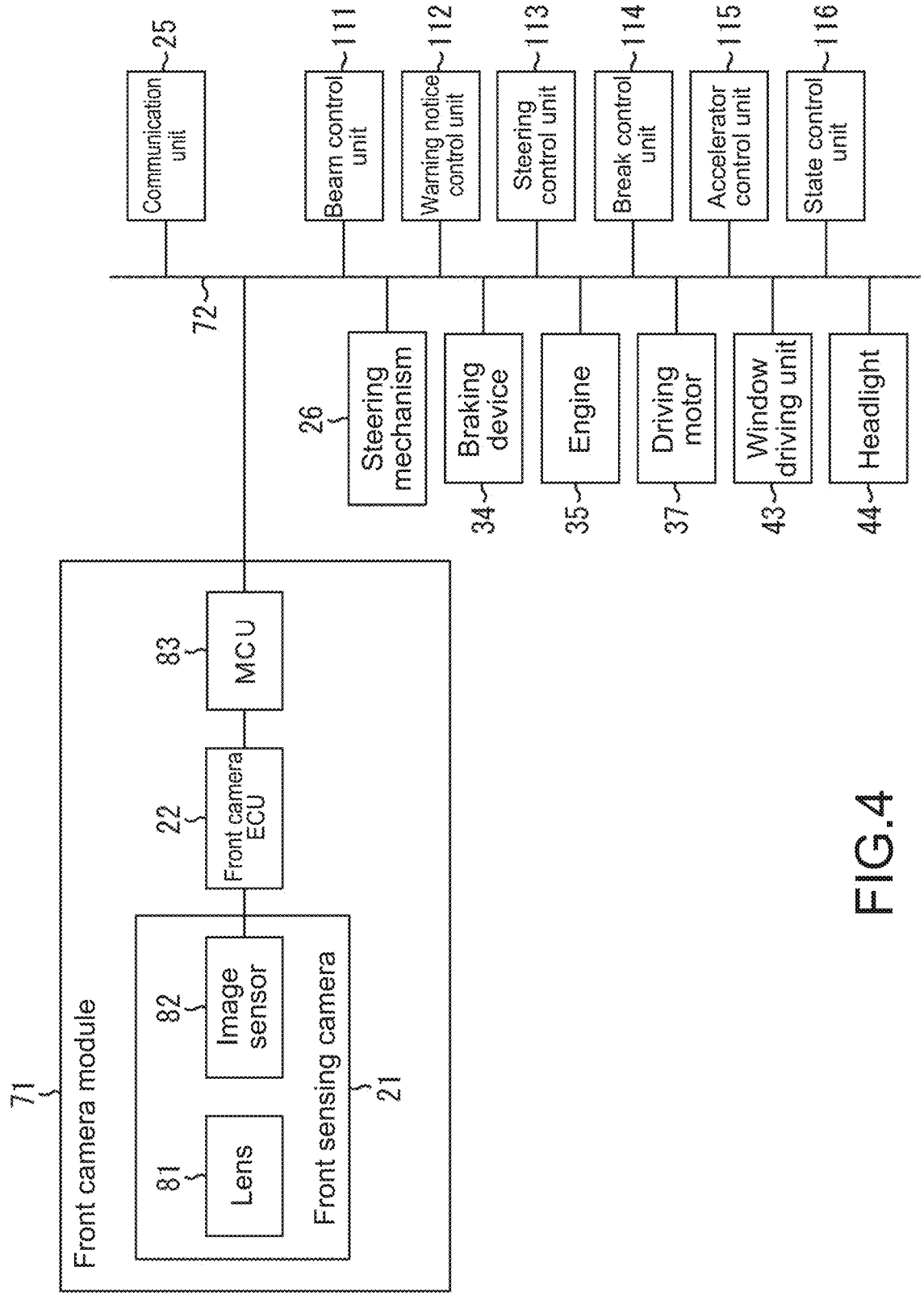
FIG. 4 is a diagram showing another connection example by the bus for CAN communication.

Further, the driving control ECU 51 does not necessarily need to control the plurality of different functions. For example, as shown in FIG. 4, a control unit may be provided for control content, i.e., each function. Note that the components corresponding to those in FIG. 2 are denoted by the same reference symbols in FIG. 4, and description thereof will be appropriately omitted.

In the example shown in FIG. 4, to the bus 72 for CAN communication, a plurality of units including the front camera module 71, the communication unit 25, the steering mechanism 26, the braking device 34, the engine 35, the driving motor 37, the window control unit 43, the headlight 44, a beam control unit 111, a warning notice control unit 112, a steering control unit 113, a break control unit 114, an accelerator control unit 115, an a state control unit 116 are connected.

In this example, the control performed by the driving control ECU 51 in the example shown in FIG. 2 is shared and performed by the beam control unit 111, the warning notice control unit 112, the steering control unit 113, the break control unit 114, the accelerator control unit 115, and the state control unit 116.

Specifically, for example, the beam control unit 111 performs control of switching a low beam and a high beam by controlling the headlight 44 on the basis of the result of image recognition, which is obtained by the front camera ECU 22. Further, the warning notice control unit 112 controls the warning notice such as displaying of various warnings on the display unit 24 and outputting a warning message by the speaker (not shown), on the basis of the result of image recognition, which is obtained by the front camera ECU 22.

The steering control unit 113 controls the travelling direction of the vehicle 11 by controlling the steering mechanism 26 on the basis of the result of image recognition, which is obtained by the front camera ECU 22, the measurement results from the radar 27 and the lidar 28, and the like. The break control unit 114 controls the stop and deceleration of the vehicle 11 by controlling the braking device 34 on the basis of the result of image recognition, which is obtained by the front camera ECU 22, the measurement results from the radar 27 and the lidar 28, and the like.

Further, the accelerator control unit 115 controls starting and acceleration of the vehicle 11 by controlling the engine 35 and the driving motor 37 on the basis of the result of image recognition, which is obtained by the front camera ECU 22, the measurement results from the radar 27 and the lidar 28, and the like.

Further, in the drive-through area, the state control unit 116 controls the display unit 24, the window control unit 43, and the like in addition to the steering mechanism 26, the braking device 34, the engine 35, the driving motor 37, and the headlight 44 described above are appropriately controlled on the basis of the result of image recognition output from the MCU 83 to the bus 72, information supplied from other units such as the radar 27 and the lidar 28, and the sensing result from the in-vehicle sensor 42. That is, in the drive-through area, the state of the vehicle 11, which includes operations (such as presentation and opening/closing of the window) in addition to the above-mentioned driving (travelling), is controlled.

Configuration Example of Drive-Through Area Drive Control System

Figure 5:
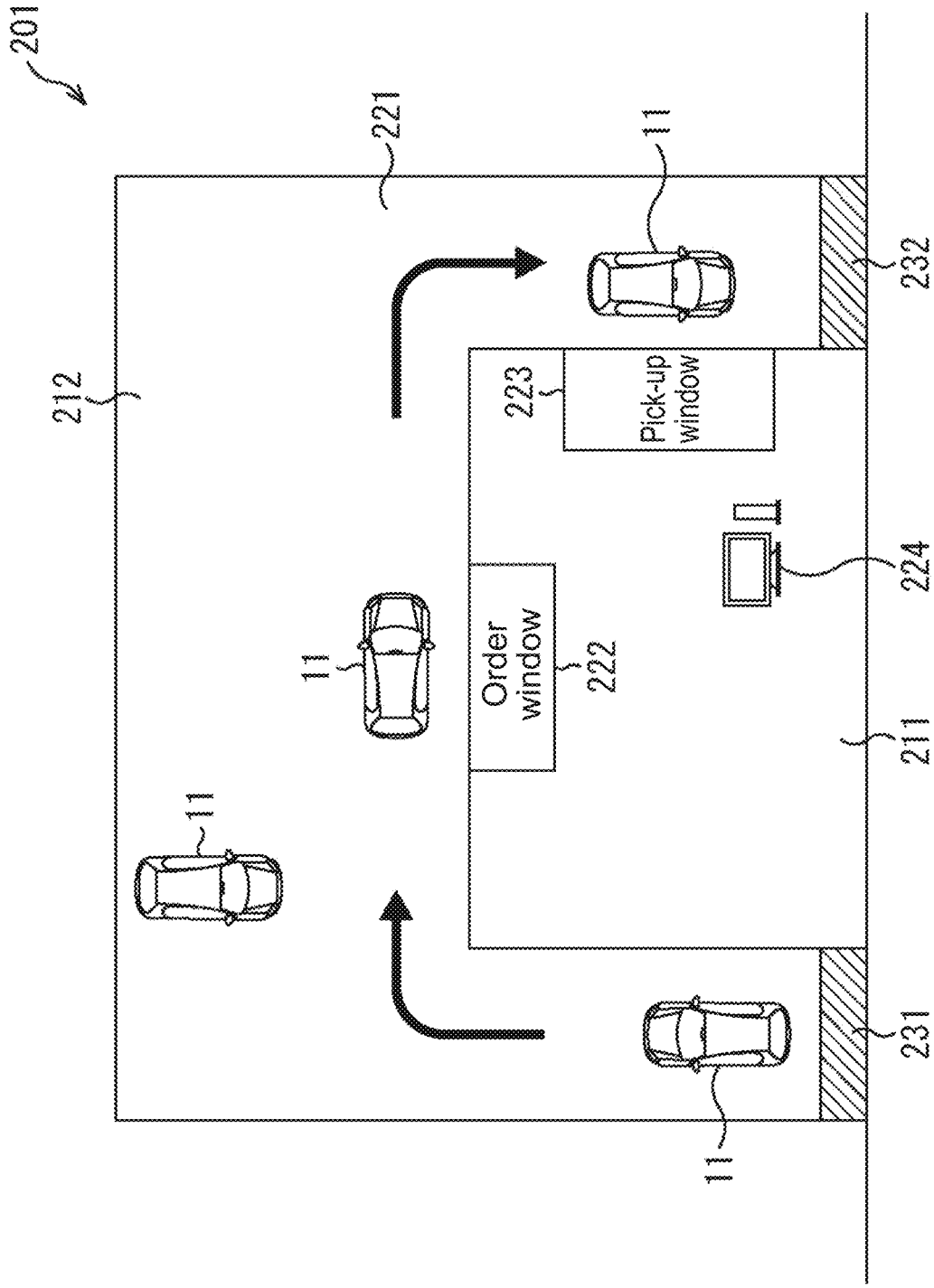
FIG. 5 is a diagram showing a configuration example of a drive-through area drive control system to which the present technology is applied.

FIG. 5 is a diagram showing a configuration example of a drive-through area drive control system to which the present technology is applied.

In the example in FIG. 5, a drive-through area drive control system 201 includes the vehicle 11 and a store 211 provided with a drive-through facility. Note that the store 211 includes also a parking lot 212 for the vehicle 11 that does not receive the drive-through service, at the back of the drive-through facility.

As the drive-through facility, a drive-through area 221 that is a path through which the vehicle 11 travels along an arrow, an order window 222 at which a user places an order, a pick-up window 223 at which the user pays to the store 211 and receives services or products from the store 211, and a terminal 224 for managing accounting of the store 211, and the like are included. The drive-through area 221 includes an entrance 231 and an exit 232 leading to a road. For example, in the example in FIG. 5, an example of the drive-through facility that provides a hamburger will be described.

In the vehicle 11, being in a drive-through area is detected on the basis of the result of image recognition from the front camera ECU 22, the position information from the position information acquisition unit 23, various types of information such as the peripheral vehicle information supplied from the communication unit 25, the measurement results from the radar 27 and the lidar 28, the detection result of the travelling speed from the speed detection unit 41, the detection result from the in-vehicle sensor 42, and the like, and the above-mentioned driving control ECU 51 controls, in the detected drive-through area, the state of the vehicle 11 including driving (travelling) and operations (such as presentation and opening/closing of the window) of the vehicle 11.

Figure 6:
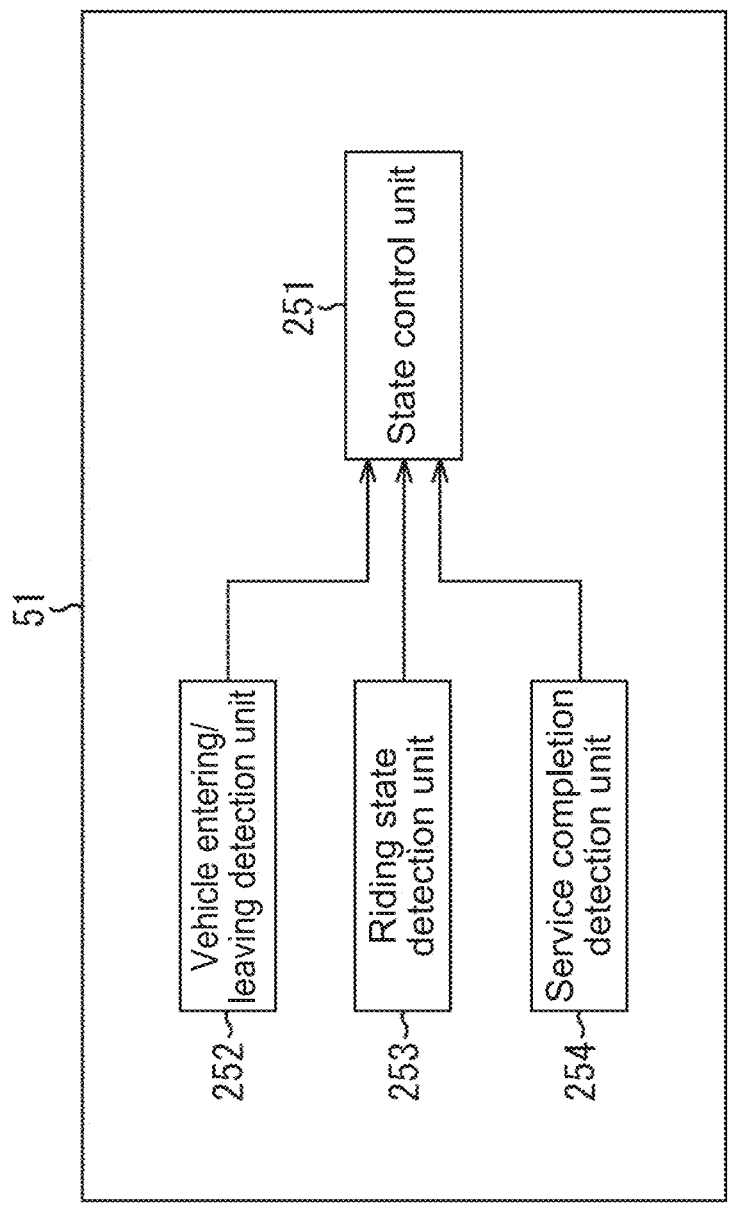
FIG. 6 is a block diagram showing a configuration of a functional configuration of a driving control ECU.

Here, in the drive-through area drive control system 201, the driving control ECU 51 includes a state control unit 251, a vehicle entering/leaving detection unit 252, a riding state detection unit 253, and a service completion detection unit 254, as shown in FIG. 6.

The state control unit 251 controls, in the drive-through area detected by the vehicle entering/leaving detection unit 252, the state of the vehicle 11 including driving (travelling) and operations (such as presentation and opening/closing of the window) of the vehicle 11, in accordance with the detection results of the vehicle entering/leaving detection unit 252, the riding state detection unit 253, the service completion detection unit 254, and the like.

The vehicle entering/leaving detection unit 252 detects that the vehicle 11 is in the drive-through area, and supplies the detection result to the state control unit 251. Further, the vehicle entering/leaving detection unit 252 detects that the vehicle 11 that has been in the drive-through area (in a drive-through area mode) leaves from the exit, and supplies the detection result to the state control unit 251.

The riding state detection unit 253 detects, on the basis of the detection result from the in-vehicle sensor 42, the riding state of the vehicle 11, e.g., how many passengers are sitting in the front seat or the rear seat of the vehicle 11 and whether he/she is an adult or a child, and supplies the detection result to the state control unit 251.

The service completion detection unit 254 detects the completion of services (ordering, providing, and payment) on the basis of the image from the front sensing camera 21, for example. Further, for example, a service completion signal is transmitted from the terminal 224 to the vehicle 11 when a clerk presses a button or the like, which indicates the completion of the services, of the terminal 224 in the store 211, and the service completion detection unit 254 receives it to detect the completion of the services.

With these functional blocks, the drive-through area drive control system 201 will be specifically described. The vehicle entering/leaving detection unit 252 determines whether or not it is in the drive-through area, at the entrance 231 of the drive-through area 221. For this determination, for example, the result of image recognition performed on a signboard representing "Drive-through IN, Entrance" or the like from the front camera ECU 22, or the position information from the position information acquisition unit 23 using map information is used, as an example of control performed by the vehicle 11. A sensor or the like for recognizing the entrance may be installed at the entrance 231.

Note that this also applies to the exit 232 of the drive-through area 221. That is, at the exit 232 of the drive-through area 221, for detection of leaving the drive-through area 221, for example, the result of image recognition performed on a signboard representing "Drive-through OUT, Exit" or the like from the front camera ECU 22, or the position information from the position information acquisition unit 23 using map information is used, as an example of control performed by the vehicle 11. A sensor or the like for recognizing the exit may be installed at the exit 232.

In the case where it is determined to be in the drive-through area, the state control unit 251 causes the display unit 24 to display a screen for prompting setting of the drive-through area mode. By operating OK (not shown) by the user, the mode of the vehicle 11 is set to a drive mode. Note that in the case where it is determined to be in the drive-through area, the mode may be immediately set to the drive-through area mode without any suggestion. In the drive-through area mode, automatic driving (guidance for the vehicle 11 on the basis of the facility of the drive-through area 221) is performed.

The state control unit 251 controls the steering mechanism 26, the braking device 34, the engine 35, the driving motor 37, and the like to cause the vehicle 11 to start moving to the order window 222. Here, the riding state detection unit 253 detects, on the basis of the detection result from the in-vehicle sensor 42, the riding state of the vehicle 11, e.g., how many passengers are sitting in the front seat or the rear seat of the vehicle 11 and whether he/she is an adult or a child. Note that in the case where a child seat has been detected, it can be determined that, for example, a child is riding or an adult is not on the place.

The state control unit 251 determines a stop position when ordering corresponding to the riding state of the vehicle 11 from the riding state detection unit 253. For example, as shown in Part A of FIG. 7, in the case where a father (adult) is sitting on the driver's seat and a mother (adult) and a child are sitting on the rear seat, the state control unit 251 determines, to the optimal position where the mother sitting on the rear seat places an order, the stop position of the vehicle 11 when ordering at the order window 222. For example, as shown in Part B of FIG. 7, in the case where a father (adult) is sitting in the driver's seat and only children are sitting in the rear seat, the state control unit 251 determines, to the optimal position where the father on the driver's seat places an order, the stop position of the vehicle 11 when ordering at the order window 222. Note that the stop position when ordering at the order window 222 may be preferentially determined to the position of the driver's seat, and a stop position when providing at the pick-up window 223 may be preferentially determined to the position of the rear seat. Further, when no one is sitting on the driver's seat side (right side) of the rear seat, it is favorable to determine, to the position of the driver's seat, the stop position when providing even in the case where an adult is sitting on the left side of the rear seat, because there is a distance from the seat on the left side to the window on the right side.

Further, at the pick-up window 223, the stop position when ordering may be set to the position of the driver's seat by default, and other setting may be made in the case where there is another passenger. Further, it may be suggested to the user that other setting can be made, only in the case where there is another passenger.

Note that for example, in the case where an adult is sitting in the rear seat, the stop position determined by the state control unit 251 may be presented to the display unit 24, and a desired position may be selected. Further, each stop position may be set by the user in advance.

Figure 7:
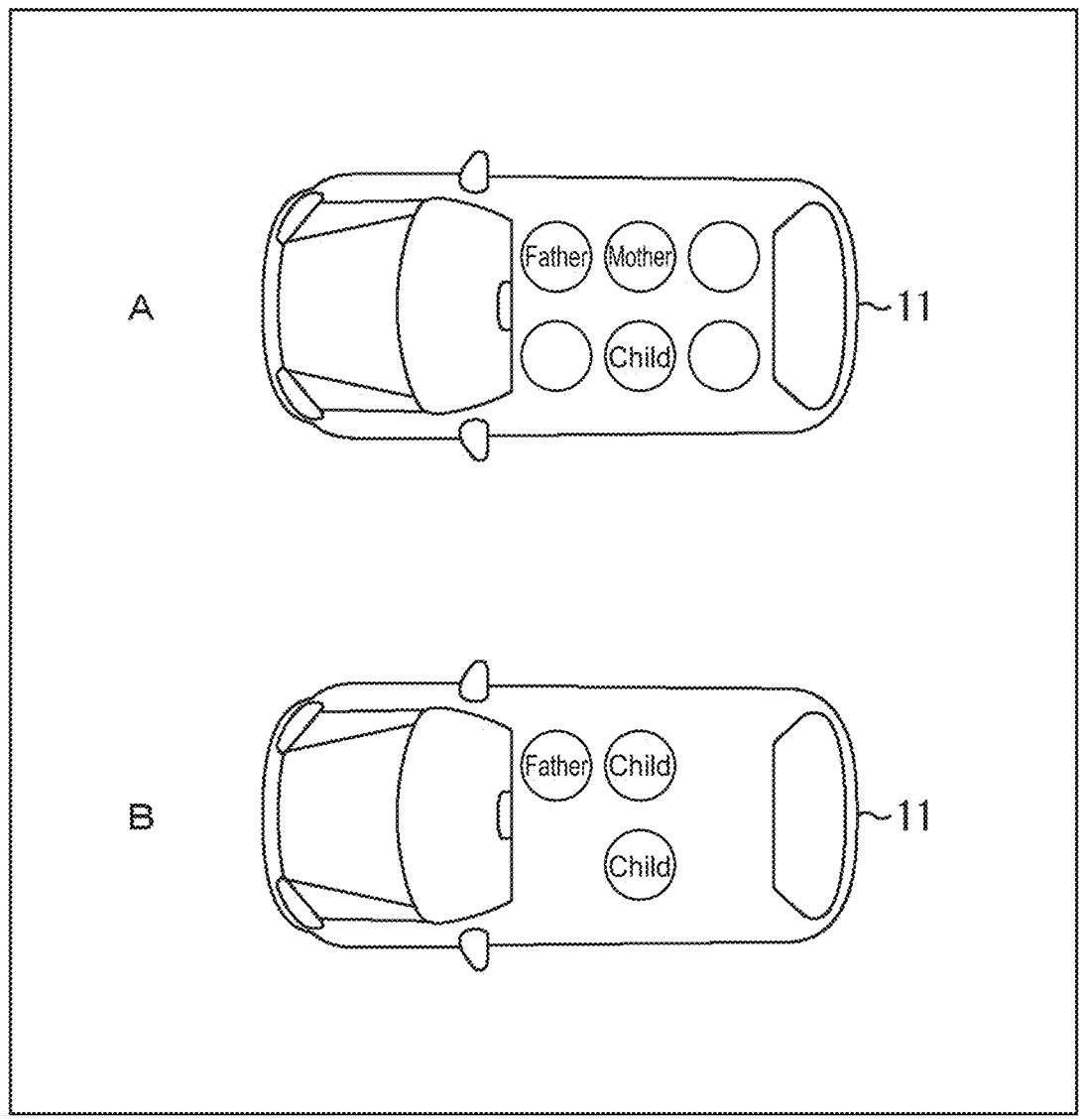
FIG. 7 is a diagram describing a vehicle riding state.

Note that in the example in FIG. 7, although the case where the driver's seat is on the right side as in Japan is described, the right and left positions in the vehicle 11 in FIG. 7 are reversed for the case where the driver's seat is on the left side as in the United States.

The vehicle 11 is controlled to decelerate from the position (that can be set to, for example, three m) before the stop position when ordering. The state control unit 251 stands by until the position of the vehicle 11 reaches the determined stop position when ordering, and controls, in the case where it is determined that it has reached the stop position, the steering mechanism 26, the braking device 34, the engine 35, the driving motor 37, and the like to stop the vehicle 11.

Further, the state control unit 251 stops the vehicle 11 at the stop position when ordering, and then, controls the window driving unit 43 to automatically open the window so that the user is capable of immediately placing an order. Note that for example, in the case where the window has been originally opened, the opening/closing of the window is not performed. Meanwhile, in the case where the window is half-opened, control of completely opening it is performed. Further, the control of opening the window may be performed corresponding to the weather, e.g., the window is not opened in the case where the air condition is turned ON or it is rainy. For example, weather information, e.g., being rainy because the wiper is moving, may be acquired from a network via the communication unit 25, or the front sensing camera 21 may be used for detecting raindrops of the windshield. At that time, a rain sensor may be used. Further, by using map information or security information metadata acquired from the position information acquisition unit 23, it is also possible to perform control so that the window is not opened at places where security is poor. Note that although the control of opening the window is performed after stopping in the above description, it may be performed before the stopping.

Then, the user places an order. In response thereto, the service completion detection unit 254 may detect the completion of services (such as ordering) on the basis of the image from the front sensing camera 21, for example. Note that the detection of completion may be performed on the basis of not the image but voice recognition. Further, for example, a clerk presses a button or the like, which indicates the completion of services, of a GUI of the terminal 224 in the store 211, and thus, an order completion signal is transmitted from the terminal 224 to the vehicle 11. In response thereto, the order completion signal received by the communication unit 25 may be supplied to the state control unit 251, and the vehicle 11 may start moving to the next place. Note that the same applies to the pick-up window 223.

For example, in the case of the pick-up window 223, a providing completion button, a payment completion button, and the like are provided in the GUI or the like of the terminal 224.

Next, the state control unit 251 controls the window driving unit 43 to close the window, and controls the steering mechanism 26, the braking device 34, the engine 35, the driving motor 37, and the like to cause the vehicle 11 to start moving to the pick-up window 223.

Note that since the subsequent state control at the pick-up window 223 is basically similar to that at the above-mentioned order window 222, description of the processing control is omitted.

Further, in the example of FIG. 5, although an example in which the pick-up window 223 includes also a payment window is shown, a payment window may be separately provided. In this case, the state of the vehicle 11 also at the payment window is controlled similarly to the order window 222 and the pick-up window 223. The vehicle 11 is causes to stop or start moving at at least one window, corresponding to the configuration of the window. Further, also the opening/closing of the window is controlled.

Further, in the example of FIG. 5, although the drive-through facility that provides a hamburger has been described as an example, the drive-through facility does not necessarily need to provide food, and may be one that provides various goods and services such as medicine, cleaning, car washing, and an ATM.

Figure 8:
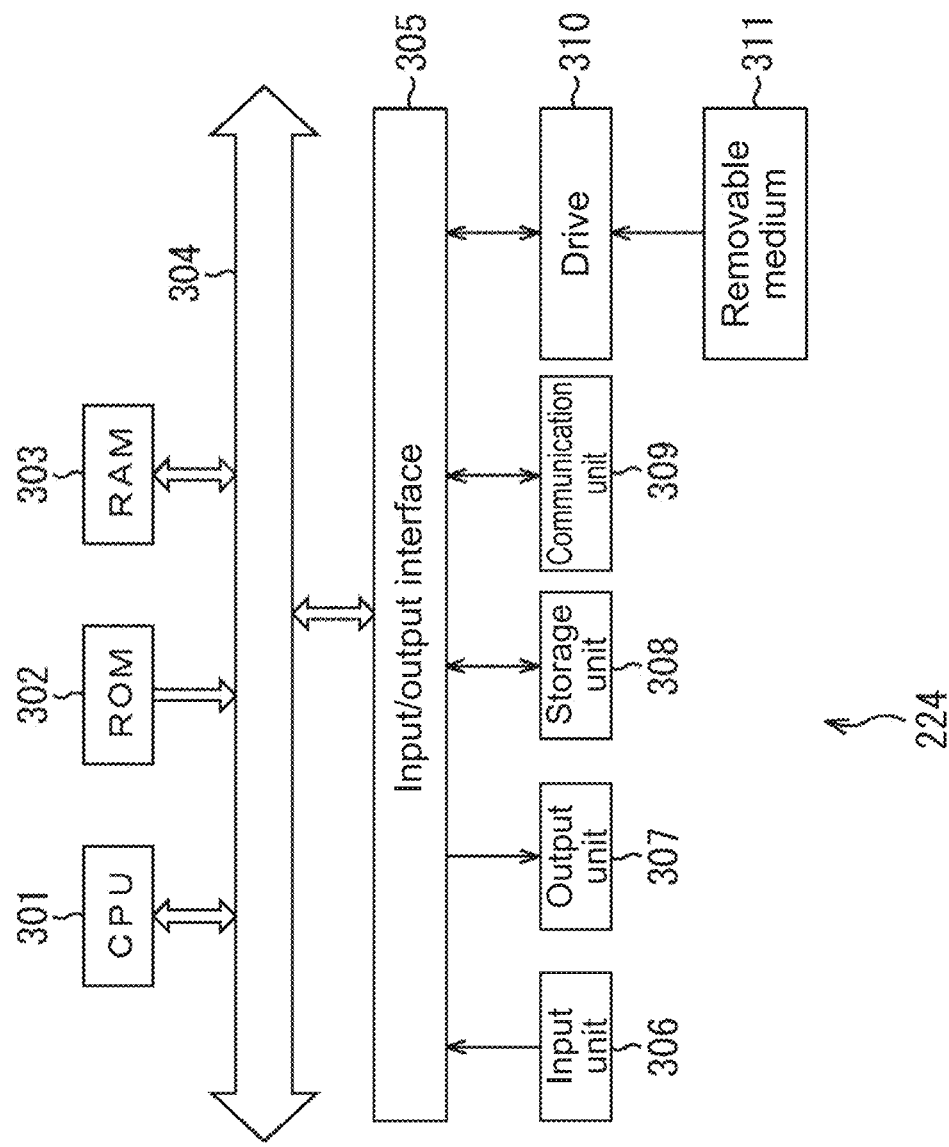
FIG. 8 is a block diagram showing a configuration example of a terminal.

FIG. 8 is a block diagram showing a configuration example of the terminal 224.

In the terminal 224, a CPU (Central Processing Unit) 301, a ROM (Read Only Memory) 302, and a RAM (Random Access Memory) 303 are connected to each other via a bus 304.

To the bus 304, an input/output interface 305 is further connected. To the input/output interface 305, an input unit 306, an output unit 307, a storage unit 308, a communication unit 309, and a drive 310 are connected.

The input unit 306 includes a keyboard, a mouse, a microphone, or the like. The output unit 307 includes a display, a speaker, or the like. The storage unit 308 includes a hard disk, a non-volatile memory, or the like. The communication unit 309 includes a network interface or the like, and communicates with the communication unit 25 of the vehicle 11 or the like. The drive 310 drives a removable medium 311 such as a magnetic disk, an optical disk, a magneto-optical disk, and a semiconductor memory.

For example, in the terminal 224, the program can be installed in the storage unit 308 via the input/output interface 305 by loading the removable medium 311 to the drive 310. Further, the program can be received by the communication unit 309 via a wired or wireless transmission medium and installed in the storage unit 308. In addition, the program can be installed in advance in the ROM 302 or the storage unit 308.

Operation of Drive-Through Area Drive Control System

Next, processing of controlling the state of the vehicle 11 in the drive-through area drive control system will be described with reference to the flowcharts of FIG. 9 to FIG. 12.

Figure 9:
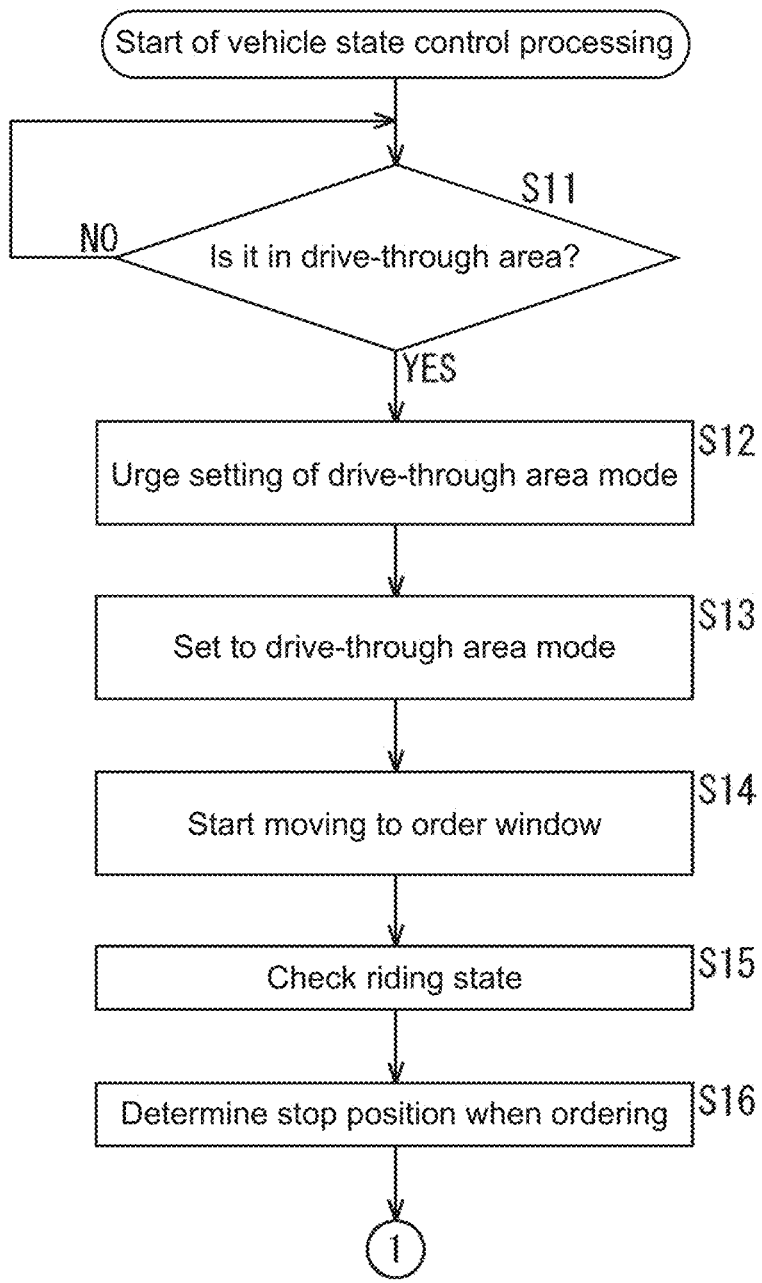
FIG. 9 is a flowchart describing vehicle state control processing in a drive-through area drive control system.

In Step S11 in FIG. 9, the vehicle entering/leaving detection unit 252 stands by until it is determined to be in a drive-through area. For example, there is a signboard representing "Drive-through IN" or the like at the entrance 231 of the drive-through area 221, or a sensor or the like for recognizing an entrance is installed at the entrance 231. In such a case, the result of image recognition performed on a signboard representing "Drive-through IN" or the like from the front camera ECU 22, or the position information from the position information acquisition unit 23 using map information is used.

In the case where it is determined to be in a drive-through area in Step S11, the processing proceeds to Step S12. That is, since being in the drive-through area is detected in Step S11, thereafter, the state of the vehicle 11 including driving (travelling) and operations (such as presentation and opening/closing of the window) of the vehicle 11 is controlled in the detected drive-through area. In other words, the processing of Step S12 and subsequent Steps correspond to the processing of controlling the state of the vehicle 12.

In Step S12, the state control unit 251 urges setting of the drive-through area mode. That is, the state control unit 251 causes the display unit 24 to display a screen urging the setting of the drive-through area mode. Watching the screen displayed on the display unit 24, the user operates that it is OK by a touch panel (not shown) or voice recognition, for example. Note that the processing of Step S12 may be omitted.

In response thereto, in Step S13, the state control unit 251 sets the mode of the vehicle 11 to the drive-through area mode. In Step S14, the state control unit 251 controls the steering mechanism 26, the braking device 34, the engine 35, the driving motor 37, and the like to cause the vehicle 11 to start moving to the order window 222. Note that in the drive-through area, the maximum speed/moving speed is set to low.

In Step S15, the riding state detection unit 253 detects, on the basis of the detection result from the in-vehicle sensor 42, the riding state of the vehicle 11, e.g., how many passengers are sitting in the front seat or the rear seat of the vehicle 11 and whether he/she is an adult or a child. Then, in Step S16, as described above with reference to FIG. 7, the riding state detection unit 253 determines the stop position when ordering, corresponding to the riding state of the vehicle 11 from the riding state detection unit 253. Note that the stop position when ordering may be preferentially determined to the position of the driver's seat, and the stop position when providing (delivering) may be preferentially determined to the position of the rear seat.

Figure 10:
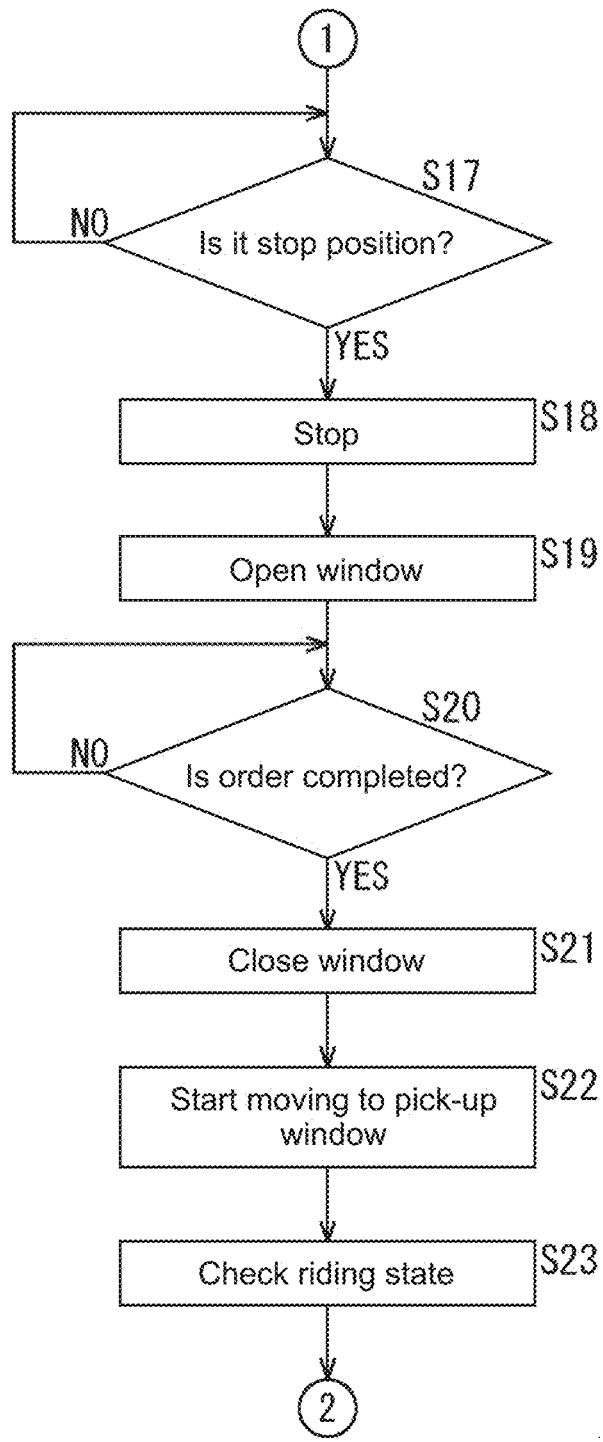
FIG. 10 is a flowchart describing the vehicle state control processing.
Figure 11:
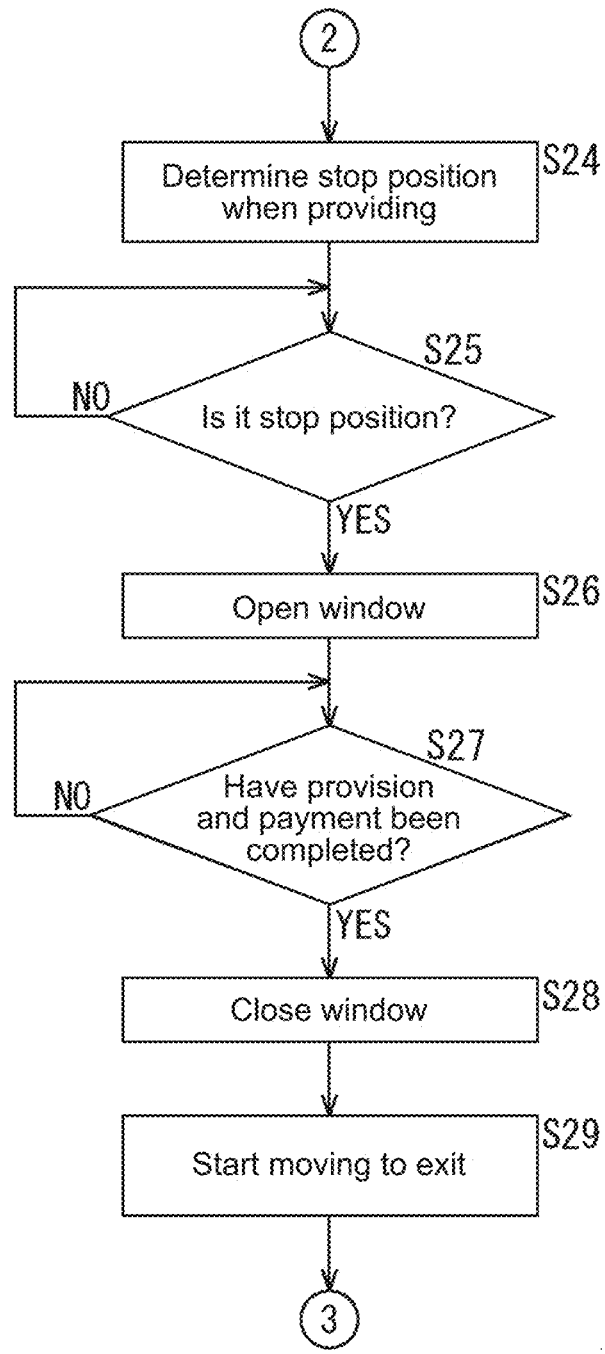
FIG. 11 is a flowchart describing the vehicle state control processing.

The state control unit 251 stands by until it is determined in Step S17 in FIG. 10 that the position of the vehicle 11 reaches the determined stop position when ordering. In the case where it is determined in Step S17 that it reaches the stop position, the processing proceeds to Step S18. In Step S18, the state control unit 251 controls the steering mechanism 26, the braking device 34, the engine 35, the driving motor 37, and the like to stop the vehicle 11.

In Step S19, the state control unit 251 controls the window driving unit 43 to open the window, corresponding to the stop position when ordering determined in Step S16 so that the user is capable of immediately placing an order. Then, the user places an order.

In Step S20, the state control unit 251 stands by until it is determined that the order has been completed. For example, the completion of the order is detected on the basis of the image from the front sensing camera 21. In response thereto, in the case where it is determined in Step S20 that the order is completed, the processing proceeds to Step S21.

The state control unit 251 controls, in Step S21, the window driving unit 43 to close window, and controls, in Step S22, the steering mechanism 26, the braking device 34, the engine 35, the driving motor 37, and the like to cause the vehicle 11 to start moving to the pick-up window 223. Note that the closing is not indispensable and does not necessarily need to be performed.

Then, in Step S23, the riding state of the vehicle 11 is detected on the basis of the detection result from the riding state detection unit 253. Then, in Step S24 in FIG. 11, the state control unit 251 determines the stop position when providing, corresponding to the riding state of the vehicle 11 as described above with reference to FIG. 7. In Step S25, the state control unit 251 controls the steering mechanism 26, the braking device 34, the engine 35, the driving motor 37, and the like to stop the vehicle 11.

In Step S26, the state control unit 251 controls the window driving unit 43 to open the window so that the user is capable of immediately placing an order. Then, the user receives the provision (receives the products) and makes the payment. Note that in addition to the above-mentioned determination method, further, at the time of payment, whether or not the payment has been completed by ETC payment can be determined. Note that although the ETC payment is performed with a special device installed in a credit card or a car in Japan, the payment may be performed simply by reading a number with a camera or attaching a dedicated tag on the windshield as in foreign countries.

In Step S27, the driving control ECU 51 stands by until it is determined that the provision and payment have been completed. For example, the completion of the payment is detected on the basis of the image from the front sensing camera 21. In response thereto, in the case where it is determined in Step S27 that the payment has been completed, the processing proceeds to Step S28.

The state control unit 251 controls, in Step S28, the window driving unit 43 to close the window, and controls, in Step S29, the steering mechanism 26, the braking device 34, the engine 35, the driving motor 37, and the like to cause the vehicle 11 to start moving to the pick-up window 223. Note that in the case where the window has been originally opened before opening the window, it does not need to close the window. Further, in the case where the window has been originally half-opened, the window is closed by the amount corresponding thereto.

Figure 12:
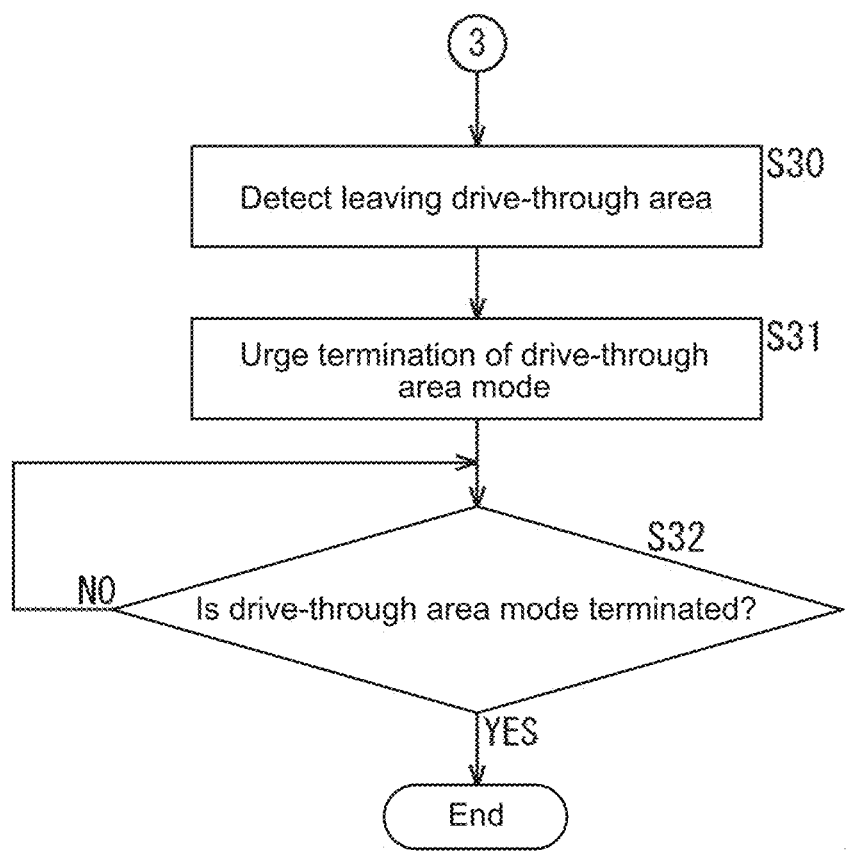
FIG. 12 is a flowchart describing the vehicle state control processing.

The state control unit 251 detects, in Step S30 in FIG. 12, the exit 232 at the exit 232 in the drive-through area 221, determines to leave the drive-through area 221, and causes, in Step S31, the display unit 24 to display the screen urging termination of the drive-through area mode. Note that at this time, it is effective to suggest, by a screen or voice, to the user that he/she should wipe the hands, because there is a possibility that he/she has eaten a hamburger or the like in the drive-through area.

In Step S32, the state control unit 251 stands by until the drive-through area mode is terminated. Watching the screen displayed on the display unit 24, the user operates OK (not shown). In response thereto, in the case where it is determined in Step S32 that the drive-through area mode is to be terminated, the drive-through area mode is terminated (setting is cancelled), and the state control processing is finished. Note that also the setting cancellation of the drive-through area mode may be performed without any suggestion similarly to the case of the setting.

As described above, in the present technology, being in a drive-through area is detected, and the state of the vehicle 11 including driving (travelling) and operations (such as presentation and opening/closing of the window) of the vehicle 11 is controlled in the detected drive-through area. Accordingly, it is possible to perform driving assistance in the drive-through area.

Note that although the timing of opening the window is after stopping at the window and the timing of closing the window is after the service at the window is finished in the examples shown in FIG. 9 to FIG. 12, the window may be opened as long as it is after the timing when being in the drive-through area has been detected, the window may be closed after the final service at the window is finished even in the case where the opening/closing of the window is not performed at each window, or the window may be closed before leaving the drive-through area. Whether or not the window is opened/closed, the opening/closing timing, in what situation the window is not to be opened, and the like may be set in advance. Further, it does not necessarily need to perform operation control regarding the opening/closing of the window, and it may be suggested to the user that he/she should opening/close the window.

Further, although an example in which the vehicle 11 starts moving after the service has been completed has been described in this example, it may be when the user is about to step on the accelerator. Further, in the case where an object is dropped from a window or the like, since it can be imaged by the side view camera 29 or the like and detected, irregular processing, e.g., stopping of automatic driving, may be performed.

Note that although the example in which the vehicle 11 is controlled by an in-vehicle sensor or camera has been described above, the store 211 may be controlled as a whole. For example, in this case, the terminal 224 on the store side functions as not only an accountant apparatus but also a vehicle state control apparatus, and performs a cloud-like operation. The terminal 224 receives the result sensed by the vehicle, and transmits a control signal to the vehicle. In this way, the above-mentioned control on the vehicle is realized by the terminal 224 on the store side.

Further, for example, in order to stop at the optimal position for ordering, payment, and provision at the order window 222, the pick-up window 223, or the like, on the side of the store 211, an infrared sensor (trip-wire sensor) is prepared at this position. When the vehicle 11 reaches the position of the infrared sensor, a stop signal is transmitted to the vehicle 11 by V2I (Vehicle-to-Infrastructure), road-to-vehicle communication. In response thereto, by supplying the stop signal received by the communication unit 25 to the driving control ECU 51, stop control may be performed by the vehicle 11.

The series of processes described above can be performed by hardware or software. In the case where the series of processes are performed by the software, programs that constitute the software are installed in a computer. Examples of the computer include a computer incorporated in dedicated hardware, a general-purpose personal computer capable of executing various functions by installing various programs, as described above with reference to the terminal 224 FIG. 5, and the like.

Note that the program executed by the computer may be a program in which processing is chronologically performed in the order described herein or may be a program in which processing is performed in parallel or at a necessary timing, for example, upon calling.

Note that, herein, the steps describing the program to be recorded in a recording medium, of course, include processing chronologically performed in the described order. However, the processing does not necessarily need to be chronologically performed. The steps also include processing executed in parallel or individually.

Further, herein, the system represents the entire apparatus including a plurality of devices (apparatuses).

Note that embodiments of the present disclosure are not limited to the above-mentioned embodiment, and various changes may be made without departing from the gist of the present disclosure.

For example, the present disclosure may take a cloud computing configuration in which a single function is shared and commonly processed by a plurality of apparatuses over a network.

Further, the configuration described above as a single apparatus (or processing unit) may be divided and configured as a plurality of apparatuses (or processing units). In contrast, the configurations described above as a plurality of apparatuses (or processing units) may be collectively configured as a single apparatus (or processing unit). Alternatively, of course, the configuration other than those described above may be added to the configuration of each apparatus (or each processing unit). In addition, as long as the configuration and the operation as the entire system are substantially the same, part of the configuration of a certain apparatus (or processing unit) may be included in the configuration of another apparatus (or another processing unit). That is, the present technology is not limited to the above-mentioned embodiment and can be variously changed without departing from the gist of the present technology.

Although the favorable embodiment of the present disclosure has been described in detail with reference to the attached drawings, the present disclosure is not limited to such examples. It should be understood by those having ordinary knowledge in the art to which the present disclosure pertains that it is clear that various variants and modifications can be achieved within the technical concept described in the scope of claims, which also belong to the technical range of the present disclosure, of course.

It should be noted that the present technology may also take the following configurations.

(1) A vehicle state control apparatus, including:
a vehicle entering/leaving detection unit that detects being in a drive-through area; and
a control unit that controls a state of a vehicle in the drive-through area detected by the vehicle entering/leaving detection unit.

(2) The vehicle state control apparatus according to (1) above, in which
the control unit controls a travelling state of the vehicle as the state of the vehicle.

(3) The vehicle state control apparatus according to (1) above, further including
a riding state detection unit that detects a riding state of the vehicle, in which
the control unit controls the state of the vehicle, corresponding to the state of the vehicle detected by the riding state detection unit.

(4) The vehicle state control apparatus according to (1) or (2) above, further including
a riding state detection unit that detects a riding state of the vehicle, in which
the control unit controls the travelling state of the vehicle, corresponding to the state of the vehicle detected by the riding state detection unit.

(5) The vehicle state control apparatus according to (2) or (4) above, in which
the control unit stops the vehicle at at least one of an order window, a pick-up window, or a payment window, as the travelling state of the vehicle.

(6) The vehicle state control apparatus according to (5) above, in which
the control unit stops the vehicle at a position, corresponding to the riding state of the vehicle at the at least one window, as the travelling state of the vehicle.

(7) The vehicle state control apparatus according to (5) above, in which
the control unit controls, where a service at the at least one window is finished, travelling of the vehicle stopped as the travelling state of the vehicle.

(8) The vehicle state control apparatus according to (7) above, further including
a service completion detection unit that detects completion of a service, in which
the control unit controls, in accordance with a detection result of the completion of the service by the service completion detection unit, the travelling of the vehicle stopped as the travelling state of the vehicle.

(9) The vehicle state control apparatus according to (8) above, in which
the control unit causes, where the completion of the service is detected by the service completion detection unit, the vehicle stopped as the travelling state of the vehicle to start travelling.

(10) The vehicle state control apparatus according to (8) or (9) above, in which
the service is a payment service.

(11) The vehicle state control apparatus according to (3) above, in which
the control unit controls, where being in the drive-through area is detected by the vehicle entering/leaving detection unit or the vehicle is stopped at the at least one window, opening/closing of a window of the vehicle as the state of the vehicle.

(12) The vehicle state control apparatus according to (11) above, in which
the control unit controls the opening/closing of the window of the vehicle, corresponding to weather.

(13) The vehicle state control apparatus according to (11) above, in which
the control unit controls the opening/closing of the window of the vehicle, corresponding to a security state.

(14) The vehicle state control apparatus according to (11) above, in which
the control unit closes the opened window of the vehicle on a condition that the service at the at least one window is finished or services at all the windows are finished.

(15) The vehicle state control apparatus according to any one of (1) to (14) above, in which
the control unit notifies, where being in the drive-through area is detected by the vehicle entering/leaving detection unit, a user of presentation for selecting whether to set a mode of the vehicle to a drive-through area mode that is a driving assistant mode in the drive-through area.

(16) The vehicle state control apparatus according to (15) above, in which
the vehicle entering/leaving detection unit detects, where the drive-through area mode is set, leaving the drive-through area, and
the control unit notifies, where leaving the drive-through area is detected by the vehicle entering/leaving detection unit, the user of presentation regarding whether to release the drive-through area mode of the vehicle.

(17) A vehicle state control method, including: by a vehicle state control apparatus,
 detecting being in a drive-through area; and
 controlling a state of a vehicle in the detected drive-through area.

(18) A vehicle, including:
 a vehicle entering/leaving detection unit that detects being in a drive-through area; and
 a control unit that controls a state of the vehicle in the drive-through area detected by the vehicle entering/leaving detection unit.

REFERENCE SIGNS LIST 11 vehicle
21 front sensing camera
22 front camera ECU
23 position information acquisition unit
24 display unit
25 communication unit
26 steering mechanism
27 radar
28 lidar
29 side view camera
30 side view camera ECU
31 integrated ECU
32 front view camera
33 front view camera ECU
34 braking device
35 engine
36 generator
37 driving motor
38 battery
39 rear view camera
40 rear view camera ECU
41 speed detection unit
42 in-vehicle sensor
43 window control unit
51 driving control ECU
52 battery ECU
71 front camera module
72 bus
81 lens
82 image sensor
83 MCU
201 drive-through area drive control system
211 store
212 parking lot
221 drive-through area
222 order window
223 pick-up window
224 terminal
231 entrance
232 exit
251 state control unit
252 vehicle entering detection unit
253 riding state detection unit
254 service completion detection unit

The invention claimed is:
1. A vehicle control apparatus of a vehicle, comprising:
 processing circuitry disposed in the vehicle and configured to:
 detect that the vehicle is in a drive-through area;
 detect riding state information of riders in the vehicle, wherein the riding state information indicates how many riders are sitting in a front seat or a rear seat of the vehicle and whether each of the riders is an adult or a child;
 determine a stop location of the vehicle relative to at least one service location in the drive-through area based on the detected riding state information of the riders in the vehicle, so that a position of the front seat or the rear seat of the vehicle, determined based on the detected riding state information of the riders in the vehicle, corresponds to the at least one service location in the drive-through area; and
 control stopping of the vehicle at the determined stop location.

2. The vehicle control apparatus according to claim 1, wherein
 the at least one service location is an order window, a pick-up window, or a payment window.

3. The vehicle control apparatus according to claim 2, wherein
 the processing circuitry is further configured to control, where a service at the at least one service location is finished, travelling of the vehicle.

4. The vehicle control apparatus according to claim 3, wherein
 the processing circuitry is further configured to detect completion of the service,
 and to control, in accordance with a detection result of the completion of the service, the travelling of the vehicle.

5. The vehicle control apparatus according to claim 4, wherein
 the processing circuitry is further configured to cause, where the completion of the service is detected, the vehicle to start travelling.

6. The vehicle control apparatus according to claim 5, wherein
 the service is a payment service.

7. The vehicle control apparatus according to claim 1, wherein
 the processing circuitry is further configured to control, where being in the drive-through area is detected or the vehicle is stopped at the at least one service location, opening/closing of a window of the vehicle.

8. The vehicle control apparatus according to claim 7, wherein
 the processing circuitry is configured to control the opening/closing of the window of the vehicle, corresponding to weather.

9. The vehicle control apparatus according to claim 7, wherein
 the processing circuitry is configured to control the opening/closing of the window of the vehicle, corresponding to a security state.

10. The vehicle control apparatus according to claim 7, wherein
 the processing circuitry is further configured to close an opened window of the vehicle on a condition that a service at the at least one service location is finished.

11. The vehicle control apparatus according to claim 1, wherein
 the processing circuitry is further configured to notify, where being in the drive-through area is detected, a user to select whether to set a mode of the vehicle to a drive-through area mode that is a driving assistant mode in the drive-through area.

12. The vehicle control apparatus according to claim 11, wherein the processing circuitry is further configured to detect, where the drive-through area mode is set, leaving the drive-through area, and to notify, where leaving the drive-through area is detected, the user to release the drive-through area mode of the vehicle.

13. A vehicle control method, comprising: by a vehicle control apparatus disposed in a vehicle,
- detecting that the vehicle is in a drive-through area;
- detecting riding state information of riders in the vehicle, wherein the riding state information indicates how many riders are sitting in a front seat or a rear seat of the vehicle and whether each of the riders is an adult or a child;
- determining a stop location of the vehicle relative to at least one service location in the drive-through area based on the detected riding state information of the riders in the vehicle, so that a position of the front seat or the rear seat of the vehicle, determined based on the detected riding state information of the riders in the vehicle, corresponds to the at least one service location in the drive-through area; and
- controlling stopping of the vehicle at the determined stop location.

14. A vehicle, comprising:
processing circuitry disposed in the vehicle and configured to:
- detect that the vehicle is in a drive-through area;
- detect riding state information of riders in the vehicle, wherein the riding state information indicates how many riders are sitting in a front seat or a rear seat of the vehicle and whether each of the riders is an adult or a child;
- determine a stop location of the vehicle relative to at least one service location in the drive-through area based on the detected riding state information of the riders in the vehicle, so that a position of the front seat or the rear seat of the vehicle, determined based on the detected riding state information of the riders in the vehicle, corresponds to the at least one service location in the drive-through area; and
- control stopping of the vehicle at the determined stop location.

* * * * *